(12) United States Patent
Cho

(10) Patent No.: US 7,979,810 B2
(45) Date of Patent: Jul. 12, 2011

(54) METHOD AND MOBILE TERMINAL FOR SELECTING A MENU

(75) Inventor: Young Hyun Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 827 days.

(21) Appl. No.: 11/626,322

(22) Filed: Jan. 23, 2007

(65) Prior Publication Data

US 2007/0180403 A1 Aug. 2, 2007

(30) Foreign Application Priority Data

Jan. 23, 2006 (KR) .................. 10-2006-0006654

(51) Int. Cl.
*G06F 3/14* (2006.01)
(52) U.S. Cl. ........ 715/864; 715/767; 715/810; 715/815; 715/817; 715/840
(58) Field of Classification Search .................. 715/864, 715/767, 810, 815, 817, 840, 835
See application file for complete search history.

(56) References Cited

U.S. PATENT DOCUMENTS

| | | | | |
|---|---|---|---|---|
| 5,565,888 | A | * | 10/1996 | Selker ........................... 715/823 |
| 6,211,921 | B1 | * | 4/2001 | Cherian et al. ................ 348/565 |
| 2004/0250217 | A1 | * | 12/2004 | Tojo et al. ..................... 715/810 |
| 2005/0248527 | A1 | * | 11/2005 | Scott ............................. 345/156 |

FOREIGN PATENT DOCUMENTS

| | | |
|---|---|---|
| EP | 1028570 A1 | 8/2000 |
| WO | WO 02/39712 A2 | 5/2002 |
| WO | WO 2004/097573 A2 | 11/2004 |

* cited by examiner

*Primary Examiner* — William L Bashore
*Assistant Examiner* — Daniel Um
(74) *Attorney, Agent, or Firm* — Lee, Hong, Degerman, Kang & Waimey

(57) ABSTRACT

A method and mobile terminal for selecting a menu are disclosed. The present invention includes arranging at least two of a plurality of displayed menus in a preset manner and executing menus corresponding to a selected terminal input key. By arranging a plurality of activated menu icons in a plurality of directions, selection of a specific icon from a plurality of displayed menu icons by selecting one of the plurality of the directions using navigations keys is facilitated and the speed of selecting a terminal menu is considerably enhanced.

10 Claims, 6 Drawing Sheets

(3a-1)          (3a-2)

(4a)

(4b)

METHOD AND MOBILE TERMINAL FOR SELECTING A MENU

CROSS-REFERENCE TO RELATED APPLICATIONS

This application claims the benefit of the Korean Patent Application No. 10-2006-0006654, filed on Jan. 23, 2006, which is hereby incorporated by reference as if fully set forth herein.

FIELD OF THE INVENTION

The present invention is directed to a mobile terminal, and more particularly, to a method of selecting a menu and terminal implementing the method. Although the present invention is suitable for a wide scope of applications, it is particularly suitable for selecting a menu displayed on a screen of a mobile terminal.

DESCRIPTION OF THE RELATED ART

The remarkable developments in information communication technologies have brought rapid advancement transitions of information and communication environments. A mobile communication terminal is now regarded as a necessity in a modern society.

In order to meet user's demands related to the expansion of the capabilities of mobile communication terminals, various functions, such as a short message service function, an MMS (multimedia messaging system) function, an Internet access function as well as a general voice calling function, are provided in a mobile communication terminal.

Various additional functions, such as an MP3 play function, a camera function and a game function, as well as a basic communication function are provided in a single mobile communication terminal as the tendency to provide multiple functions in one device expands. Therefore, various menus related to the multiple functions are frequently displayed simultaneously on one screen of a terminal. Hence, a method or system facilitating a user to access a specific menu among various menus is needed.

SUMMARY OF THE INVENTION

An object of the present invention is to provide a method of selecting a menu and mobile terminal implementing the method, by which a terminal user is allowed to access a specific menu from among various menus displayed on one screen of the mobile communication terminal.

In one aspect of the present invention, a method of selecting a menu in a mobile terminal is provided. The method includes arranging at least a first and a second of a plurality of displayed menus in a preset manner such that each of the at least first and second arranged menus correspond to a first and second terminal input key and executing a specific menu upon selection of one of the first and second terminal input keys by a terminal user, the specific menu corresponding to the selected terminal input key.

It is contemplated that the method further includes re-arranging the at least first and second arranged menus such that at least a third and a fourth of the plurality of displayed menus each correspond to the first and second terminal input keys. It is further contemplated that the at least first and second arranged menus no longer correspond to a terminal input key.

It is contemplated that the re-arrangement is performed according to a request made by the terminal user. It is further contemplated that the first and second terminal input keys are navigation keys of the terminal.

It is contemplated that arranging the at least first and second of the plurality of displayed menus includes displaying the at least first and second arranged menus such that they are visually distinguishable from the other of the plurality of displayed menus. It is further contemplated that displaying the at least first and second arranged menus includes displaying the at least first and second arranged menus in an enlarged state. Preferably, the preset manner includes arranging the at least first and second arranged menus such that they are each located at one of a 12 o'clock, 3 o'clock, 6 o'clock and 9 o'clock position with reference to a clock.

In another aspect of the present invention, a mobile terminal adapted for menu selection is provided. The mobile terminal includes a display unit adapted to display a plurality of menus, an input unit including a plurality of input keys and a control unit adapted to control the display unit and the input unit to arrange at least a first and second of the plurality of displayed menus in a preset manner, with each of the at least first and second arranged menus corresponding to a first and second terminal input key, and to execute a specific menu upon selection of one of the first and second terminal input keys by a terminal user, the specific menu corresponding to the selected terminal input key.

It is contemplated that the control unit is further adapted to re-arrange the at least first and second arranged menus such that at least a third and a fourth of the plurality of displayed menus each correspond to the first and second terminal input keys. It is further contemplated that the at least first and second arranged menus no longer correspond to a terminal input key.

It is contemplated that the control unit is further adapted to perform the re-arrangement according to a request made by the terminal user. It is further contemplated that the first and second terminal input keys are navigation keys.

It is contemplated that the control unit is further adapted to arrange the at least first and second of a plurality of displayed menus by displaying the at least first and second arranged menus such that they are visually distinguishable from the other of the plurality of displayed menus. It is further contemplated that the control unit is further adapted to display the at least first and second arranged menus in an enlarged state. Preferably, the control unit is further adapted to arrange the at least first and second arranged menus such that they are each located at one of a 12 o'clock, 3 o'clock, 6 o'clock and 9 o'clock position with reference to a clock.

In another aspect of the present invention, a method of selecting a menu in a mobile terminal is provided. The method includes arranging a portion of a plurality of displayed menus in a preset manner such that each of the portion of arranged menus corresponds to a different terminal navigation input key and executing a specific menu upon selection of one of the terminal navigation input keys by a terminal user, the specific menu corresponding to the selected terminal navigation input key.

It is contemplated that arranging the portion of the plurality of displayed menus includes displaying the portion of arranged menus corresponding to the different terminal navigation input keys in an enlarged state. It is further contemplated that the method further includes changing a positional relationship between the portion of arranged menus and the corresponding different terminal navigation input keys by changing positions of the plurality of displayed menus. Preferably, arranging the portion of the plurality of displayed menus includes displaying the portion of the plurality of displayed menus in a circular formation.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention is applicable not only to a mobile terminal, such as a mobile phone, a PDA (personal digital assistant) and a game player, but also to a kiosk terminal, such as an automatic teller machine (ATM). However, it is assumed that the present invention is applied to a mobile terminal, such as a mobile phone, for convenience and simplicity of explanation in the following description. Therefore, it should be understood that the present invention is not limited to the following explanation and embodiments.

Figure 1:
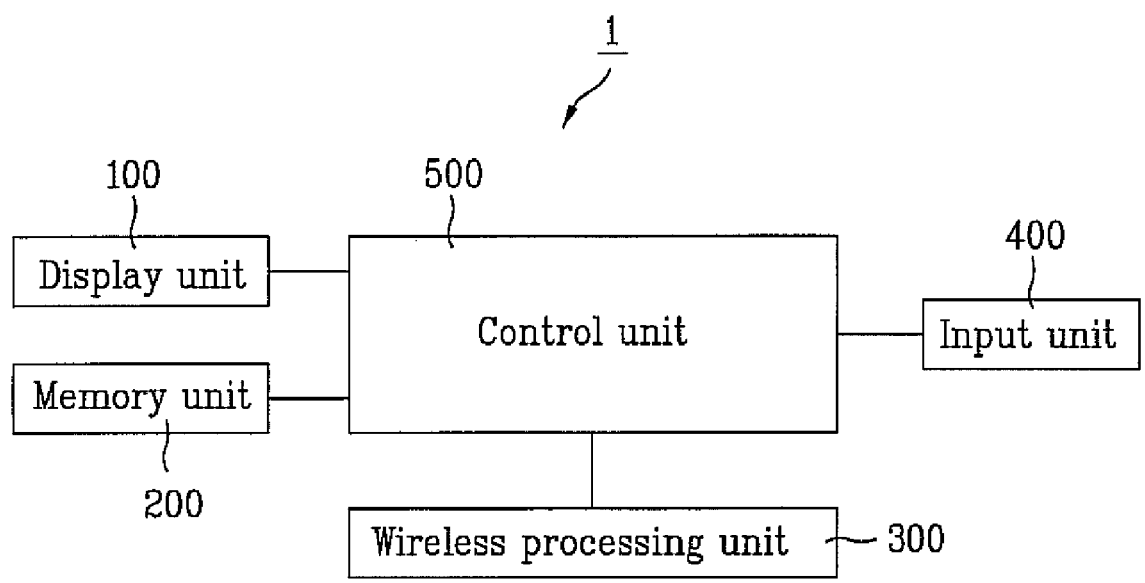
FIG. 1 illustrates a block diagram of a mobile terminal according to one embodiment of the present invention.
Figure 2:
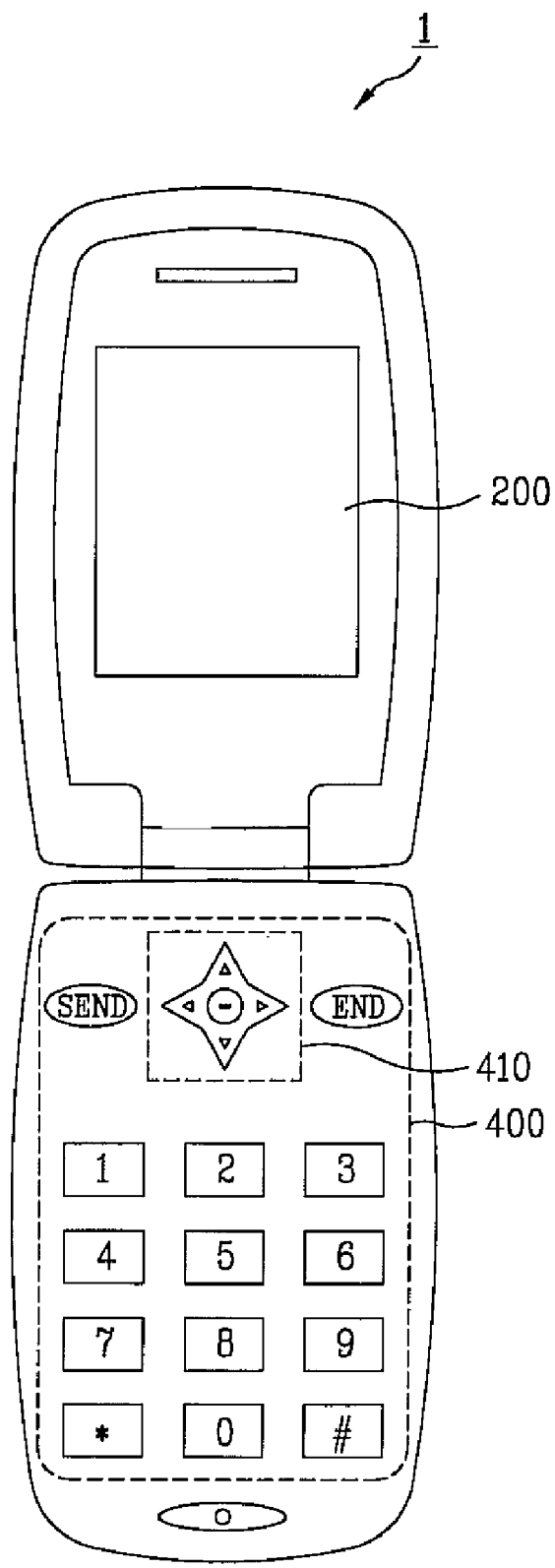
FIG. 2 is a front view of the mobile terminal illustrated in FIG. 1.

FIG. 1 illustrates a schematic block diagram of a mobile terminal 1 according to one embodiment of the present invention. FIG. 2 is a front view of the mobile terminal 1 illustrated in FIG. 1.

As illustrated in FIGS. 1 and 2, the mobile terminal 1 includes a display unit 100, a memory unit 200, a wireless processing unit 300, an input unit 400 and a control unit 500. The mobile terminal 1 may be provided with various other additional elements, such as a mobile broadcast receiving unit (not shown) and a camera unit (not shown). Explanations of the additional elements will be omitted in the following description for concise explanation of the present invention since the additional elements are not directly associated with the present invention.

The display unit 100 displays menus to execute various functions provided by the mobile terminal 1. The menus are displayed in order to allow a terminal user to select one of the menus. Selection of the menus will be explained later.

The memory unit 200 stores software to drive various functions provided by the mobile terminal 1 and various data associated with the software. The wireless processing unit 300 processes an RF signal to enable the mobile terminal 1 to communicate with an external environment though voice communications or short message services.

The input unit 400 enables the terminal user to input various commands or information to the mobile terminal 1. Preferably, the input unit 400 includes a keypad. More preferably, the input unit 400 includes navigation input keys 410.

The input unit 400 facilitates displaying the menus on the display unit 100 in order to allow the terminal user to select the menus. Selection of the menus will be explained in detail later.

The control unit 500 controls the display unit 100, the memory unit 200, the wireless processing unit 300 and the input unit 400. Specifically, the control unit 500 facilitates a menu selecting method of the present invention to be implemented in the mobile terminal 1.

According to the menu selecting method implemented by the mobile terminal 1 according to the present invention, a menu displayed in a specific direction from among the menus displayed by the display unit 100 and a specific key of the keypad of the input unit 400 have a one-to-one correspondence. If the terminal user presses a specific key, the corresponding menu displayed in the specific direction is executed.

A menu selecting method according to one embodiment of the present invention is explained with reference to FIGS. 3A, 3B, 4 and 5. The method of selecting a specific menu specified by a terminal user from among the menus is explained assuming that the mobile terminal 1 is provided with eight types of menus, specifically menu-A, -B, -C, -D, -E, -F, -G and -H, for convenience.

Figure 3A:
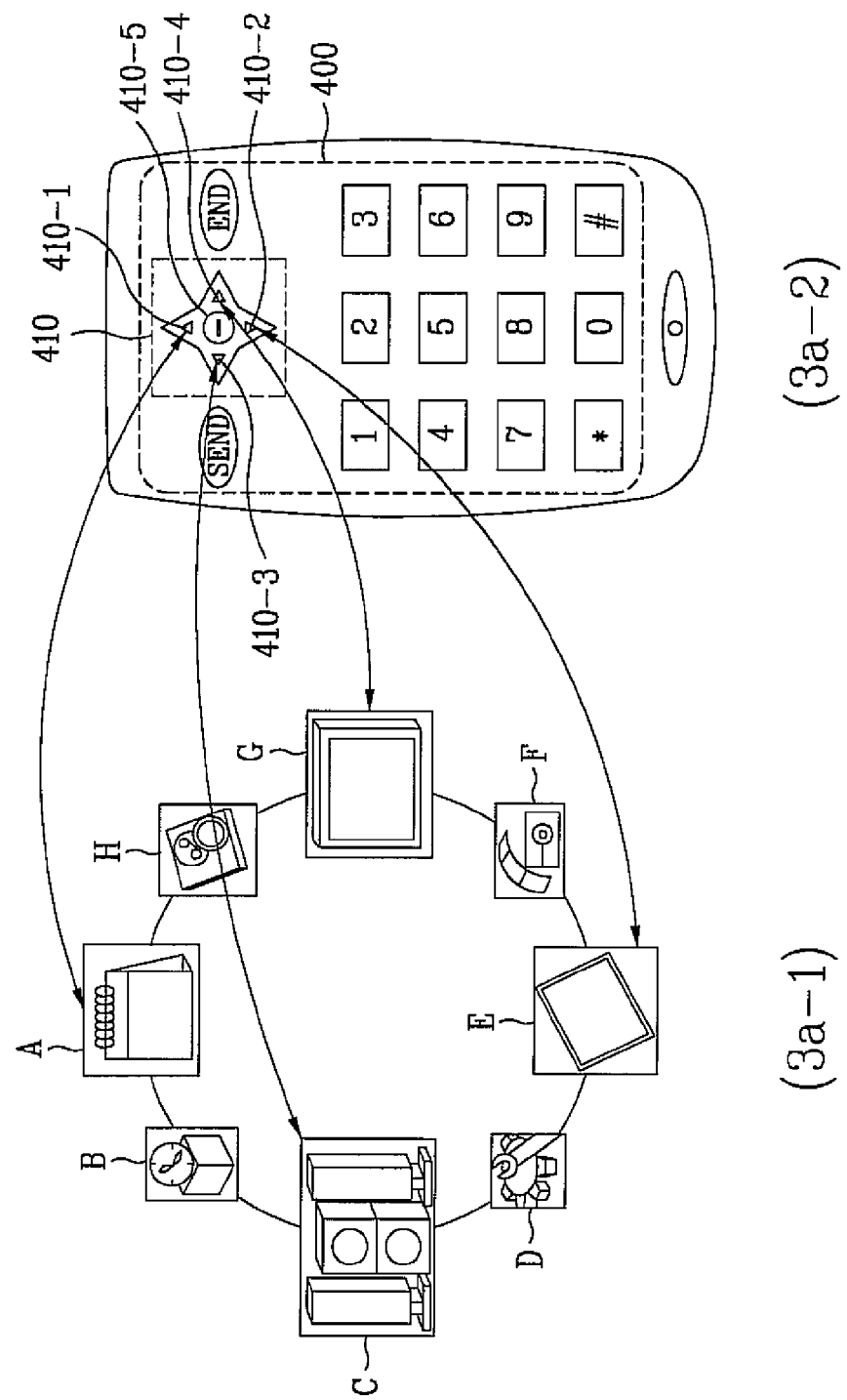
FIG. 3A and FIG. 3B illustrate diagrams of images of a display unit and an input unit when a menu selecting method according to one embodiment of the present invention is executed.
Figure 3B:
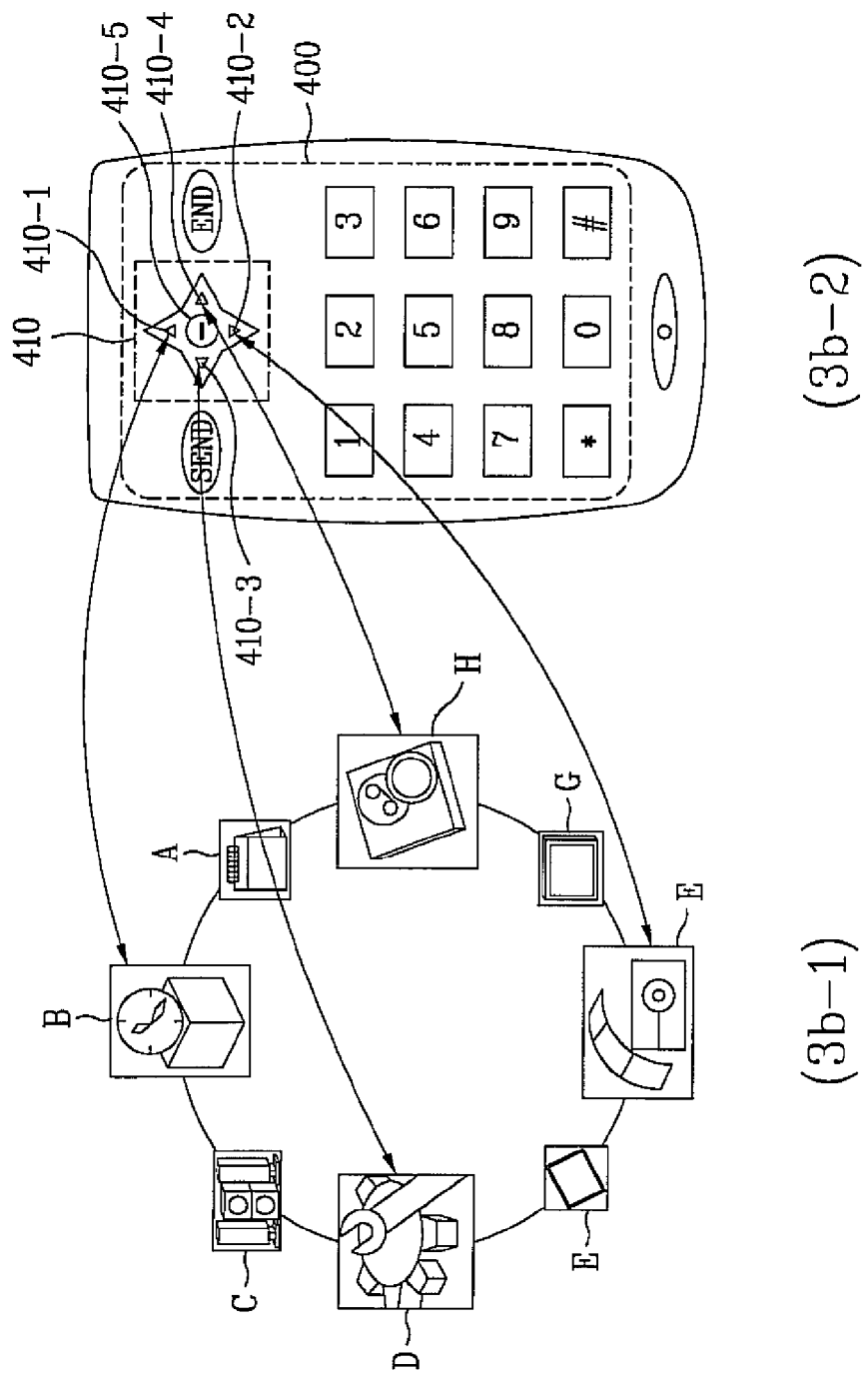
Figure 4:
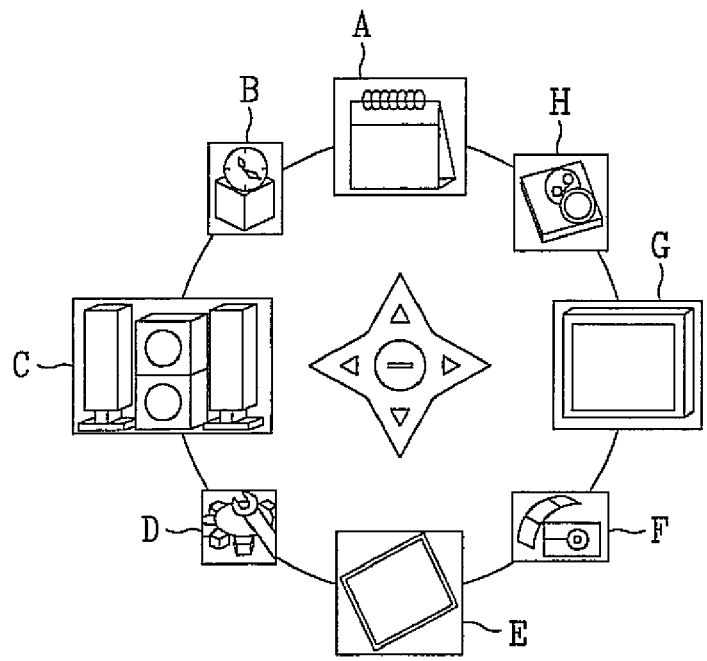
FIG. 4 illustrates transitional views of the images of the display unit illustrated in FIGS. 3A and 3B.
Figure 4:
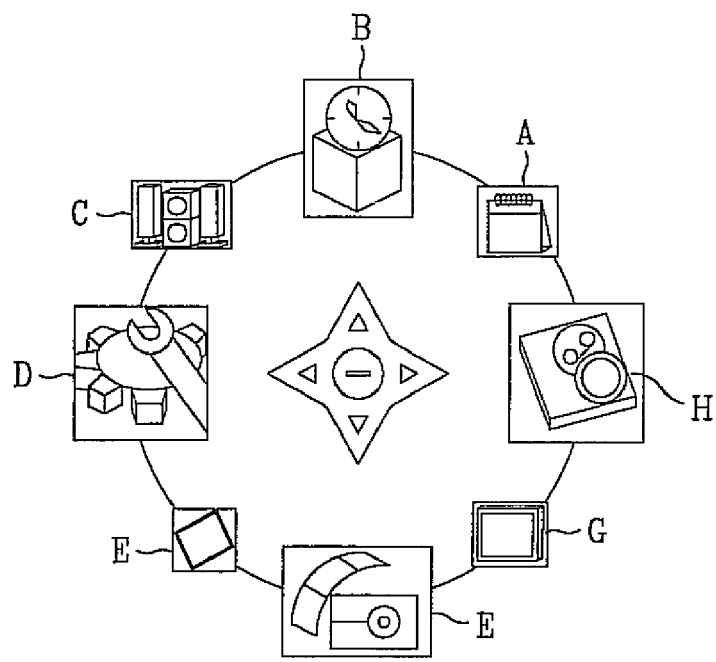
Figure 5:
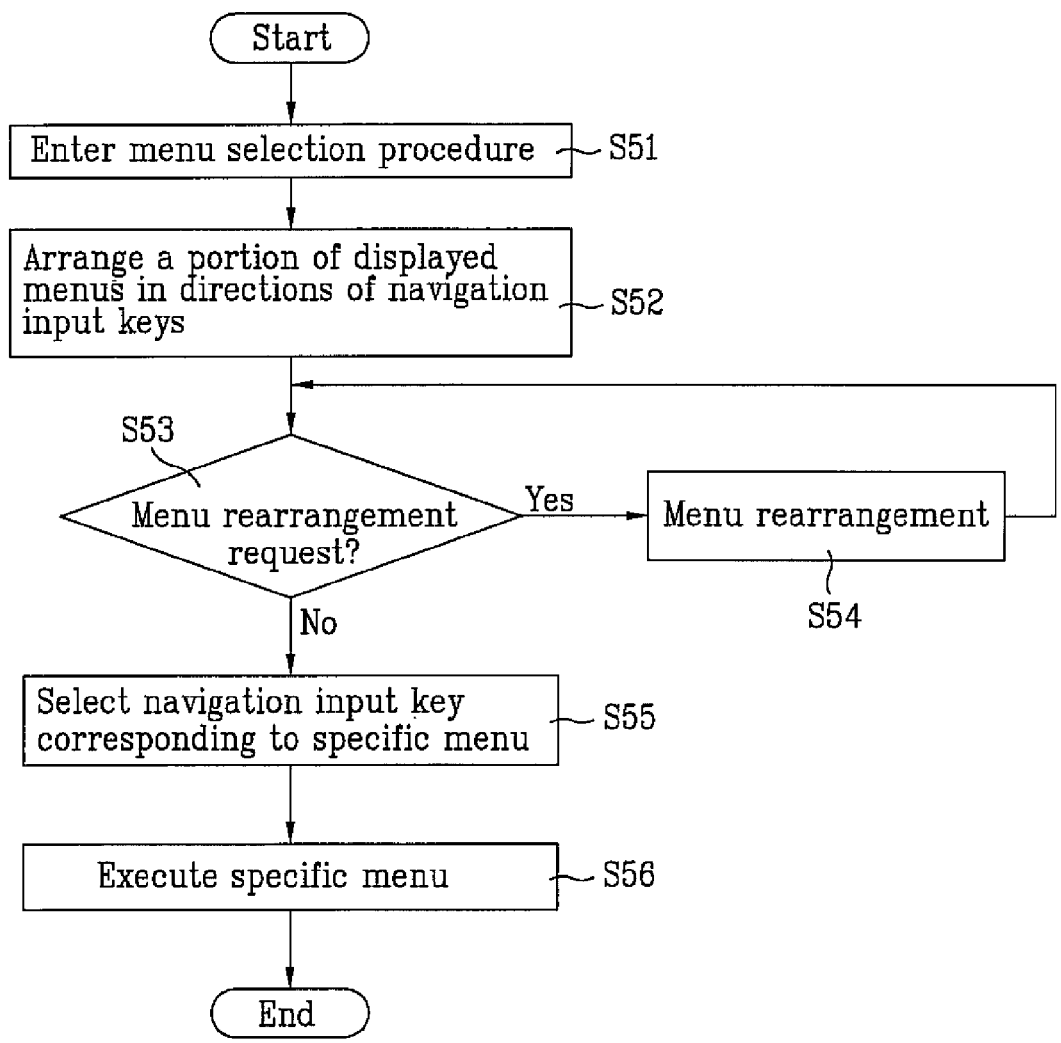
FIG. 5 illustrates a flowchart of a method of selecting a menu according to one embodiment of the present invention.

FIG. 3A and FIG. 3B are diagrams illustrating images of a display unit 100 and an input unit 400 when a menu selecting method according to one embodiment of the present invention is executed. FIG. 4 illustrates transitional view of the images of the display unit 100 illustrated in FIG. 3A and FIG. 3B. FIG. 5 is a flowchart of a method of selecting a menu according to one embodiment of the present invention.

Assuming that the mobile terminal 1 is provided with eight types of menus, specifically menu-A, -B, -C, -D, -E, -F, -G and -H for convenience.

The terminal user enters a menu selection procedure (S51). Then, the eight types of menus representing various functions provided by the mobile terminal 1 are displayed in a circular formation (S52), as illustrated in 3a-1 of FIG. 3A.

Preferably, at least two of a plurality of the displayed menus are arranged in previously set directions. However, it should be noted that the formation of the displayed menus is not limited to the circular formation. For example, the menus may be displayed in a rectangular formation.

Preferably, the menus arranged in the preset directions among the displayed menus are displayed such that they can be visually distinguished from the rest of the menus. The preset direction is not limited to a specific direction. The following description assumes that the preset directions are 12, 6, 9 and 3 o'clock directions in the circular formation.

As illustrated in FIG. 3A, menu-A, -E, -C and -G are arranged in the 12, 6, 9 and 3 o'clock directions, respectively, and displayed in an enlarged manner greater than the rest of the menus such that they may be visually distinguished from the rest of the menus. The enlarged displayed menu-A, -C, -E and -G correspond to an upper key 410-1, a lower key 410-2, a left key 410-3 and a right key 410-4 of upper, lower, left and right navigations input keys 410 of the input unit 400, respectively.

However, it is not necessary that menu-A, -C, -E and -G to correspond to the navigation input keys. For example, menu-A, -C, -E and -G may correspond to the '2', '8', '4' and '6' keys of the input unit 400, respectively.

If the terminal user desires to select menu-C, for example, menu-C may be selected by pressing the left key 410-3 without separately rearranging positions of the menus (S53, S55). In this way, menu-C selected via the left key 410-3 and executed (S56).

If desired, the terminal user is able to select menu-A by pressing the upper key 410-1, the menu-G by pressing the right key 410-4 or the menu-E by pressing the lower key 410-2. On the other hand, the terminal user may desire to select a menu among menu-B, D, F, and H other than the enlarged and displayed menu-A, -C, -E and -G. The case where the terminal user desires to select menu-B is explained as follows.

Menu-B does not correspond to any one of the navigation input keys. Therefore, the terminal user presses a center key 410-5 among the navigations keys for rearrangement of menus (S53, S54). The key is not limited to the center key 410-5.

Each of the menus is shifted by one position clockwise, as illustrated in 3*b*-1 of FIG. 3B. The menu-B that the terminal user desires to select is now located in the 12 o'clock direction and is enlarged and displayed. Furthermore, menu-D, -F and -H are enlarged and displayed in the 9, 6 and 3 o'clock directions, respectively, as well.

The menu-B, -F, -D and -H now correspond to the upper key 410-1, the lower key 410-2, the left key 410-3 and the right key 410-4 among the navigation input keys, respectively. Menu-B is selected and executed (S55, S56) if the terminal user presses the upper key 410-1. If desired, the terminal user is able to select menu-F by pressing the lower key 410-2, the menu-D by pressing the left key 410-3 or the menu-H by pressing the right key 410-4.

As illustrated in (4*a*) and (4*b*) of FIG. 4, the menus assigned to the navigation input keys may be more clearly recognized by the terminal user if the navigation key shapes are displayed on a central part of the displayed menus. This can be easily understood by those skilled in the art and its explanation shall be omitted for the conciseness of the explanation.

Accordingly, the present invention provides several effects or advantages. Since a plurality of activated menu icons are arranged in a plurality of directions, respectively, a specific icon from a plurality of the menu icons is selected by selecting one of a plurality of directions using the navigations keys. Therefore, the present invention is able to considerably enhance the speed with which a terminal menu may be selected.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of selecting a menu in a mobile terminal, the method comprising:
   arranging at least a first, a second, a third and a fourth of a plurality of displayed menu items in a preset manner such that the first menu item corresponds to a first input key, the second menu item corresponds to a second input key and the third and fourth menu items do not correspond to either the first or second input key, wherein all of the first to fourth of the plurality of displayed menu items are simultaneously displayed;
   displaying a navigation key guide related to the first and second input keys such that the navigation key guide is displayed separately from the first to fourth menu items; and
   executing a function corresponding to a specific one of the first and second menu items upon selection of the first or second input key by a terminal user,
   wherein the first and second input keys comprise navigation keys of the terminal,
   wherein the arranged first to fourth of the plurality of displayed menu items may be re-arranged such that the third menu item corresponds to the first input key, the fourth menu item corresponds to the second input key and the first and second menu items no longer correspond to either of the first or second input key, and
   wherein each of the menu items corresponding to the first and second input keys is displayed between two of the plurality of displayed menu items not corresponding to either the first or second input key before and after the re-arrangement.

2. The method of claim 1, wherein the re-arrangement is performed according to a request made by the terminal user.

3. The method of claim 1, wherein arranging the at least first and second of the plurality of displayed menu items comprises displaying the first and second arranged menu items such that they are visually distinguishable from the other of the plurality of displayed menu items.

4. The method of claim 3, wherein the first and second arranged menu items are displayed in an enlarged state.

5. The method of claim 1, wherein the preset manner comprises arranging the first and second menu items such that they are each located at a different one of a 12 O'clock, 3 O'clock, 6 O'clock and 9 O'clock position with reference to a clock.

6. A mobile terminal adapted for menu selection, the mobile terminal comprising:
   a display unit adapted to display a plurality of menu items;
   an input unit comprising a plurality of input keys; and
   a control unit adapted to:
      control the display unit and the input unit to arrange a first, a second, a third and a fourth of the plurality of displayed menu items in a preset manner such that the first menu item corresponds to a first input key, the second menu item corresponds to a second input key, the third and fourth menu items do not correspond to either the first or second input key and all of the first to fourth menu items are simultaneously displayed;
      control the display unit to display a navigation key guide related to the plurality of input keys such as the navigation key guide is displayed separately from the first to fourth menu items; and
      execute a function corresponding to a specific one of the first and second menu items upon selection of the first or second input key by a terminal user,
   wherein the first and second input keys comprise navigation keys,
   wherein the controller is further adapted to re-arrange the first to fourth arranged menu items such that the third menu item corresponds to the first input key, the fourth menu item corresponds to the second input key and the first and second menu items no longer correspond to either the first or second input key, and wherein each of the menu items corresponding to the first and second input keys are displayed between two of the plurality of menu items not corresponding to either the first or second input key before and after the re-arrangement.

7. The mobile terminal of claim 6, wherein the control unit is further adapted to perform the re-arrangement according to a request made by the terminal user.

8. The mobile terminal of claim 6, wherein the control unit is further adapted to arrange the first and second of the plurality of displayed menu items by displaying the first and second arranged menu items such that they are visually distinguishable from the other of the plurality of displayed menu items.

9. The mobile terminal of claim 8, wherein the control unit is further adapted to display the first and second arranged menu items in an enlarged state.

10. The mobile terminal of claim 6, wherein the control unit is further adapted to arrange the first and second menu items such that they are each located at a different one of a 12 O'clock, 3 O'clock, 6 o'clock and 9 O'clock position with reference to a clock.

* * * * *